Sept. 12, 1950      V. E. INGER      2,521,978
SPRING DRIVE
Filed Jan. 7, 1946      2 Sheets-Sheet 1
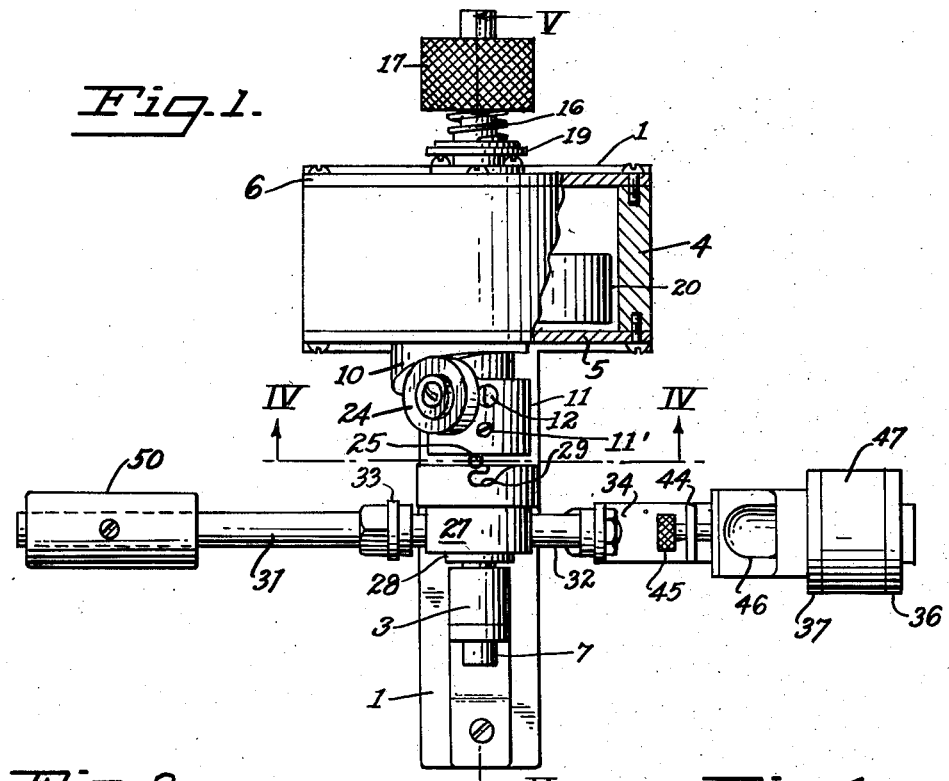
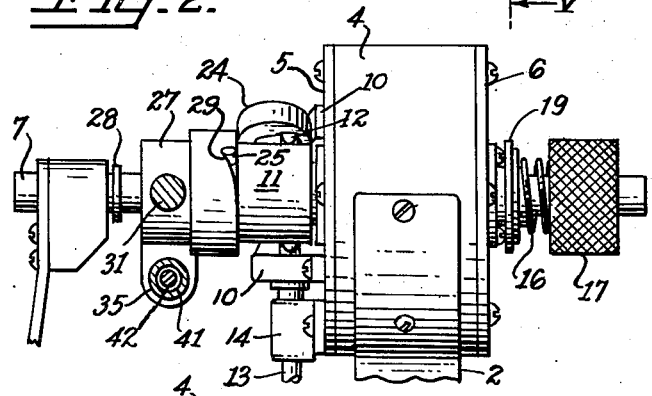
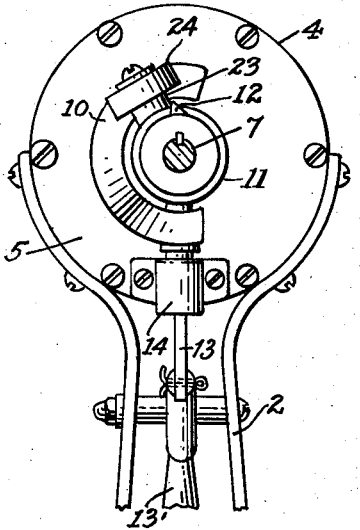
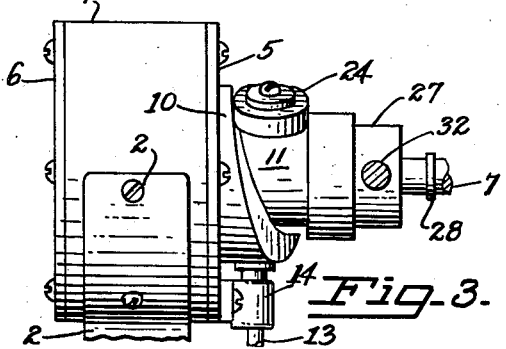
INVENTOR.
VICTOR E. INGER
BY
Baldwin Vale
ATTORNEY Sept. 12, 1950 V. E. INGER 2,521,978
SPRING DRIVE
Filed Jan. 7, 1946 2 Sheets-Sheet 2
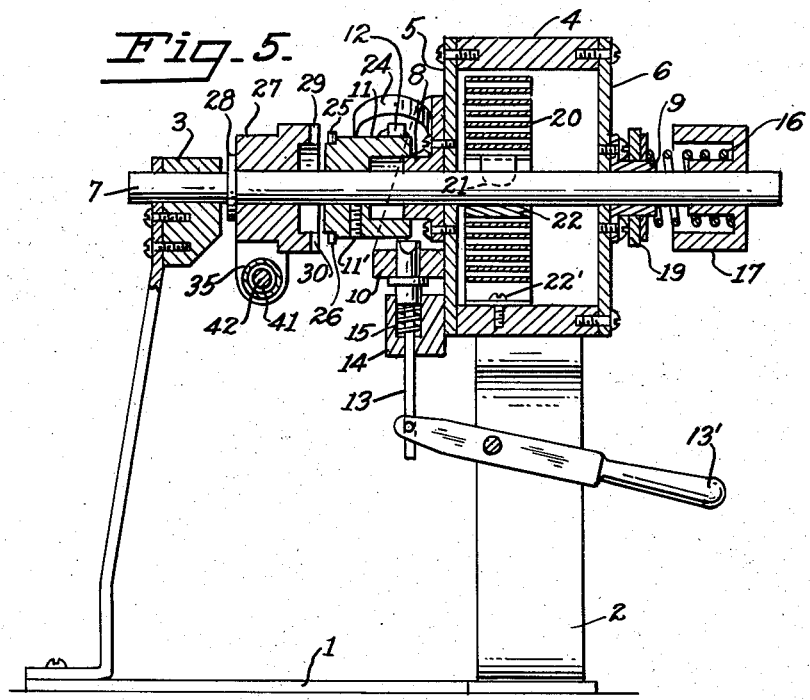
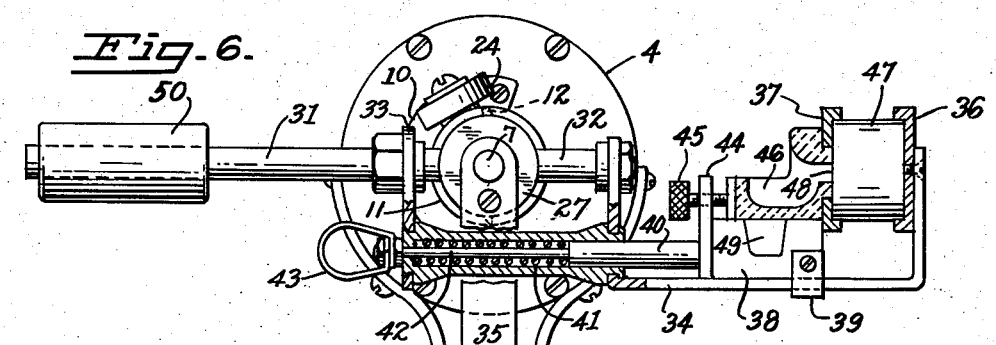
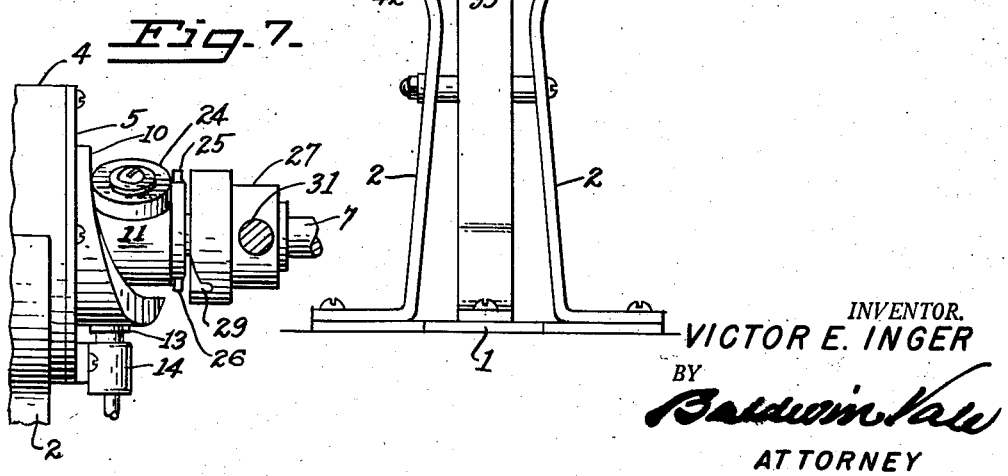
INVENTOR.
VICTOR E. INGER
BY
ATTORNEY Patented Sept. 12, 1950

2,521,978

UNITED STATES PATENT OFFICE 2,521,978

SPRING DRIVE

Victor E. Inger, Alameda, Calif.

Application January 7, 1946, Serial No. 639,621

5 Claims. (Cl. 185—37)

This invention relates to spring drives and more particularly to spring torque means for initiating centrifugal force.

Among the objects of the invention is the provision of means for metal casting under centrifugal force for dental inlays and other castings of high density without flaws.

Another object is to release the centrifugal element from the driving torque at a predetermined moment.

Other objects and advantages will appear as the description progresses. In the specification and the accompanying drawings the invention is disclosed in a specialized form. But it is to be understood that it is not limited to this form because it may be embodied in other forms within the spirit of the invention as defined in the claims following the description.

In the two sheets of drawings:

Fig. 1 is a top plan view of a spring drive embodying this invention, the parts being shown in position before the final winding of the mainspring.

Fig. 2 is a fragmentary side elevation before the final winding of the mainspring.

Fig. 3 is a view similar to Fig. 2 from the opposite side.

Fig. 4 is a rear elevation of the spring drive, partially in vertical section on the line IV—IV of Fig. 1, but with the parts in position before the final winding of the mainspring.

Fig. 5 is a vertical section on the line V—V of Fig. 1.

Fig. 6 is an end view showing the centrifugal element at rest and partially in vertical section showing the details of the casting assembly.

Fig. 7 is a fragmentary side elevation showing the cam stop for varying the longitudinal spring thrust tension and freeing the centrifugal element from the torque drive.

In detail the structure shown in Fig. 5 comprises the base 1 adapted to be firmly mounted on a bench and supporting the pedestal 2, and the out bearing 3. The annular spring case 4 is supported on the pedestal 2 and is closed by the side plates 5, 6, attached thereto. The shaft 7 is rotatable and slidable in the bearings 8, 9, mounted on the axial centers of the plates 5, 6, respectively, and in the outbearing 3.

The cam 10 is fixed to the plate 5, concentrically with the shaft 7. The driving head 11 is adjustably fixed to the shaft and revolves therewith. This head is counterbored and telescopes over the bearing 8. The head 11 has the projecting tapered catch 12, embedded therein, see Fig. 3, adapted to engage the spring actuated latch 13 slidably guided in a hole in the cam 10 and in the bracket 14 on the cover 5. This bracket is countersunk to form a socket for the expansion spring 15, bearing under the head of the latch 13 having the annular flange bearing against the outer diameter of the cam and limiting the upward movement of the latch. This latch is actuated by the hand lever 13' pivoted thereto and to the pedestal 2.

The head 11 is normally held in the retracted position shown in Fig. 5 by the tension of the buffer spring 16, expanding between the cap 17 threaded on the shaft and the divided thrust washer 19 encircling the bearing 9 and bearing against the cover 6 through the flange on the bearing 9.

The inner end of the spiral main spring 20, has a semicircular lug 21 struck inward therefrom and engaging a keyway slot in the periphery of the hub 22 fixed on the shaft 7, forming in effect a Woodruff key attachment to the shaft. The free end of this spring is screwed at 22 to the inner periphery of the stationary case 4.

The head 11 has the radial stud 23 projecting therefrom, with the cam roller 24 rotatable thereon, and rolling on the inclined annular face of the cam 10 against the tension of the spring 16, Fig. 1. This head also has the driving studs 25, 26, projecting from the periphery thereof adjacent its outer end at about 90 degrees to the roller stud 23.

The centrifugal element comprises the driven hub 27 free on the shaft 7 between the stop washer 28 fixed on the shaft and the adjacent end of the driving head 11. It is slightly countersunk and telescopes over the head 11. This countersunk end has the tangential notches 29, 30 engageable with the driving studs 25, 26, respectively.

The arms 31, 32 are threaded into the centrifugal hub 27 on opposite sides of the shaft 7 and have the depending brackets 33, 34, with the tubular spacer 35 therebetween, Fig. 6. The U shape bracket 34 has the disc 36 fixed on its outer end in opposed relation to the similar disc 37 fixed to the end of the block 38 slidable on the bracket 34 and guided by the strap 39 fixed to the block. The plunger 40 projecting from the block is guided within the spacer 35 against the expansion of the spring 41 within this spacer end encircling the stem 42. This stem projects from the spacer and has the finger loop 43 for retracting the block 38. The vertical plate 44 projects above the inner end of the block and has the set screw 45 threaded therein for forcing the vitreous crucible 46 against the disc 37 and forcing it against the matrix or mold 47 clamped between the discs by the spring 41. This crucible has the outlet neck 48 extending into the matrix. The block 38 has the gap 49 beneath the crucible to reduce heat conduction to the block. The weight of the assembly on the bracket 34 is accurately counterbalanced by the weight 50 adjustable on the arm 31.

The invention operates substantially as follows: In casting dental inlays for instance, the proper quantity of alloy metal is placed in the crucible 46 and reduced to a molten fluid state by a blow flame or an electric arc. The handle 13' is grasped in the left hand and held in locking position by the spring 15. The counterweight 50 is grasped in the right hand and moved laterally until the notches 29, 30 engage the driving studs 25, 26 on the head 11. The arm 31 is then swung upward about one quarter turn until the catch 12 engages behind the latch 13 which winds up and latches the mainspring 20. This spring yields sidewise under the urge of the cam and roller 10, 24. The roller 24 is then in the position shown in Fig. 4 ahead of the taper of the cam 10.

The hand lever 13' is then elevated, which releases the catch and latch 12, 13, permitting the mainspring 20 to unwind and apply torque to the shaft 7. The rotating head 11 carries the roller 24 up the incline of the cam 10 forcing the centrifugal hub 27 longitudinally on the shaft 7 until the notches 29, 30 are disengaged from the studs 25, 26. The centrifugal element assembly on the centrifugal hub 27 continues to rotate freely on the shaft 7, due to the initial torque applied by the mainspring 20.

The initial rotation of the centrifugal element causes the molten metal to flow from the crucible 46 into the matrix 47. The continued rotation causes the metal to flow into the intricacies of the matrix, forcing out any impounded air or gases in the matrix, and assures a homogeneous density in the cast inlay as it cools under centrifugal force.

The tension of the spring 16 retains the roller 24 in contact with the cam 10 during the act of winding the main spring. The tension of the retarding spring 16 is eased as the roller 24 follows down the cam 10 and the main spring 20 moves sidewise from a true spiral into a slight helix.

When the latch 13 is released the side tension of the mainspring 20 forces the shaft 7 and the driving head 11 and driven head 27 longitudinally toward the bearing 3 simultaneously with the torque applied to the shaft by the mainspring 20. This longitudinal thrust of the shaft 7 is imparted to the driven head which is set free to revolve on the shaft 7 which is brought to a stop by the rise of the roller 24 on the cam 10 applying a compressive action on the retarding buffer spring 16. In this manner the spring 16 applies a braking action to stop the rotation of the shaft 7 at any adjusted position, but does not exert any influence on the driven head 27 revolving freely on the stationary shaft 7. By adjusting the tension of the spring 16 by means of the cap 17 threaded on the shaft 7, the torque applied to the shaft by the mainspring 20 may be adjusted to terminate at any desired moment, which disconnects the driven head 27 from the driving head 11. In this manner the desired interval of centrifugal force is applied to the molding assembly 34—50. The driving notches 29, 30 in the driven head are directed to engage the studs 25, 26 to wind the mainspring 20 in the clockwise direction. When the torque of the mainspring is released it drives the shaft 7 contra-clockwise which releases the notches from the studs when the shaft 7 is stopped by stoppage of the roller 24 at the adjusted position by the tension of the spring 16 as described.

The application of torque to the shaft 7 by the mainspring 20 may be adjusted by varying the tension of the expansive buffer spring 16 by turning the cap 17 on the threaded end of the shaft 7. Increasing the tension at 16 retards the rise of the roller 24 up the incline of the cam 10 and vice versa, so that the position of the roller 24 on the cam 10 determines the moment that the tension of the unwinding mainspring is arrested, which permits the driven head 27 to disengage from the driving head and continue to revolve by the momentum imparted to it by the mainspring 20. The release of the sidewise distortion of the woundup mainspring imparts a longitudinal thrust to the shaft 7 as the mainspring unwinds which thrust continues in the driven head 27 which detaches the engagement of the notches 29, 30 with the studs 25, 26, permitting free centrifugal revolution of the driven head on the now stationary shaft 7.

Having fully described this invention and its mode of operation, what I claim and desire to secure by Letters Patent is:

1. A spring drive comprising a base with a spring case thereon having bearings therein, a rotary shaft extending through and longitudinally slidable in said bearings, a main spring having its opposite ends attached to said case and said shaft respectively, a driving head fixed on said shaft, a driven head revolving freely on said shaft and detachably engaging said driven head for winding said mainspring, latch means for locking said mainspring in wound position manually operable for selectively releasing said mainspring for applying torque to said shaft, and means interposed between said case and shaft for moving said shaft longitudinally in said bearings for a predetermined distance for stopping the rotation of the shaft and releasing said driven head from engagement with said driving head simultaneously with the unwinding of the mainspring.

2. A spring drive comprising a base with a spring case thereon having bearings therein, a rotary shaft extending through and longitudinally slidable in said bearings, a mainspring having its opposite ends attached to said case and said shaft respectively, a driving head fixed on said shaft, a driven head revolving freely on said shaft and detachably engaging said driven head for winding said mainspring, latch means for locking said mainspring in wound position manually operable for selectively releasing said mainspring for applying torque to said shaft, and cam means interposed between said case and shaft for moving said shaft longitudinally in said bearings for a predetermined distance for stopping the rotation of the shaft and releasing said driven head from engagement with said driving head simultaneously with the unwinding of the mainspring.

3. A spring drive comprising a base with a spring case thereon having bearings therein, a rotary shaft extending through and longitudinally slidable in said bearings, a mainspring having its opposite ends attached to said case and shaft respectively, a driving head fixed on said shaft and having a radial stud projecting from its periphery, a driven head revolving freely on said shaft and telescoping over said driving head and having an inclined open notch engaging said stud, means interposed between said driving head and case for moving said shaft longitudinally in said bearings and for arresting the longitudinal movement of said shaft simultaneously with the unwinding of said mainspring, for automatically detaching said notch from said stud and permitting said driven head to revolve freely on said shaft under the momentum imparted to it by the forceful unwinding of said mainspring.

4. A spring drive comprising a base with a spring case thereon having bearings therein, a rotary shaft extending through and longitudinally slidable in said bearings and projecting beyond the sides of said case, a mainspring within said case and having its opposite ends attached to said case and said shaft respectively, a cap adjustable on one of said projecting shaft ends, a buffer spring expanding between said cap and the adjacent side of said case, a driving head fixed on the other of said projecting shaft ends adjacent said case and having a catch thereon, a latch on said case engageable with said catch for locking the mainspring in wound position and manually operable for selectively releasing said mainspring for applying torque to said shaft, a driven head revolving freely on said shaft and detachably engaging said driving head for winding said mainspring, a cam on said case, and a roller on said driving head traveling on said cam and adapted to longitudinally slide said shaft in said bearings and stop the rotation of said shaft at a position predetermined by the cap adjusted tension of said buffer spring when said latch is released and the mainspring applies its stored torque to said shaft for rotating and detaching said driven head to revolve freely on said shaft.

5. A spring drive including a base with a spring case thereon, said case having bearings thereon, a rotary shaft mounted in said bearings, a coil spring within said case for driving said shaft having its opposite ends attached to said case and said shaft respectively, a driving head fixed on said shaft for rotation therewith, a driven head freely rotatable on said shaft and engageable with the driving head to rotate therewith, means for latching said driving head against rotation to lock the spring in wound position, and brake means acting during a partial revolution of the shaft when said latching means is released, to stop further rotation of the shaft and unwinding of the spring, and effect release of the driven head from engagement with the driving head for rotation of the driven head freely on the shaft under the momentum imparted to it by the unwinding of the spring.

VICTOR E. INGER.

REFERENCES CITED

The following references are of record in the file of this patent:

UNITED STATES PATENTS

| Number | Name | Date |
|---|---|---|
| Re. 17,783 | Gardner et al. | Aug. 26, 1930 |
| 1,366,875 | Collignon | Jan. 25, 1921 |
| 1,683,267 | Shoudy | Sept. 4, 1928 |
| 1,944,435 | Kerr et al. | Jan. 23, 1934 |
| 2,180,005 | Gunnarson | Nov. 14, 1939 |
| 2,202,473 | Vickers | May 28, 1940 |
| 2,235,443 | Steinbock et al. | Mar. 18, 1941 |
| 2,372,932 | Brockman | Apr. 3, 1945 |